United States Patent
Kwon

(10) Patent No.: US 9,333,907 B2
(45) Date of Patent: May 10, 2016

(54) COMBINED CONTROL DEVICE AND METHOD FOR LAMP OF VEHICLE

(71) Applicants: Hyundai Motor Company, Seoul (KR); Kia Motors Corporation, Seoul (KR)

(72) Inventor: Geon O Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 592 days.

(21) Appl. No.: 13/686,439

(22) Filed: Nov. 27, 2012

(65) Prior Publication Data

US 2014/0042904 A1 Feb. 13, 2014

(30) Foreign Application Priority Data

Aug. 7, 2012 (KR) ......................... 10-2012-0086215

(51) Int. Cl.
*B60Q 1/14* (2006.01)
*B60Q 1/44* (2006.01)

(52) U.S. Cl.
CPC ...................................... *B60Q 1/441* (2013.01)

(58) Field of Classification Search
CPC .............. B60L 3/0023; B60L 11/1868; B60L 15/2045; B60Q 1/441; B60W 10/26; B60W 20/50
See application file for complete search history.

(56) References Cited

U.S. PATENT DOCUMENTS

| 8,872,384 B2 * | 10/2014 | Stratakos | H02J 3/383 307/104 |
| 2012/0176115 A1 * | 7/2012 | Higuchi | H02H 3/087 323/311 |

FOREIGN PATENT DOCUMENTS

| JP | 2007-302122 A | 11/2007 |
| JP | 2011068295 A | 4/2011 |
| JP | 2011225055 A | 11/2011 |
| KR | 10-2004-0092060 | 11/2004 |
| KR | 10-2006-0067557 | 6/2006 |

* cited by examiner

*Primary Examiner* — Douglas W Owens
*Assistant Examiner* — Monica C King
(74) *Attorney, Agent, or Firm* — Mintz Levin Cohn Ferris Glovsky and Popeo, P.C.; Peter F. Corless

(57) ABSTRACT

A combined control apparatus includes a switch, an IPS device, a switch monitoring line, a lamp on/off monitoring line, and a switching device. The switch turns on or off a lamp. The IPS device associated with the lamp is connected to an output of the switch. The switch monitoring line is connected between the output of the switch and an input of an MCU to transmit a switch on/off state to the MCU. The lamp on/off monitoring line is connected between the input of the MCU and the IPS device to transmit a power switching signal of IPS to the MCU. The switching device is mounted in a signal transmission line connected between the output of the MCU and the IPS device to be turned on by a control signal of the MCU at a certain time after the lamp has initially been turned on by the switch.

9 Claims, 3 Drawing Sheets

- SWITCH DIRECT DRIVING METHOD -

- MCU CONTROL METHOD -

COMBINED CONTROL DEVICE AND METHOD FOR LAMP OF VEHICLE

CROSS-REFERENCE TO RELATED APPLICATION

This application claims under 35 U.S.C. §119(a) the benefit of Korean Patent Application No. 10-2012-0086215 filed Aug. 7, 2012, the entire contents of which are incorporated herein by reference.

BACKGROUND (a) Technical Field

The present invention relates to a combined control apparatus and method for a lamp of a vehicle. More particularly, the present invention relates to a combined control apparatus and method for a lamp of a vehicle, which enables turn-on control of a lamp by using a switch direct drive method together with a Micro Control Unit (MCU) control method.

(b) Background Art

Generally, lamps for vehicles include stop lamps (e.g., brake lamps) for warning following other vehicles that the vehicle is breaking, in addition to head lamps and turn signal lamps. Once a vehicle begins braking initially, the brake lamps must be quickly turned on in order to notify vehicles behind the vehicle that that vehicle is braking to prevent the subsequent vehicle from running into the back of that vehicle.

Typically, however, a certain amount of time is taken for the brake lamp to be lit, i.e., a turn-on time from the moment that the braking starts to the moment that the stop lamp is turned on, and thus this time period needs to be minimized. Typical control methods for turning on a stop lamp of a vehicle are divided into a switch direct driving method (non-MCU control method) and a Micro Control Unit (MCU) control method.

In the switch direct driving method, when a driver steps on a brake pedal, a switch is turned on to apply a current signal to an Intelligent Power Switching (IPS) device (e.g., a semiconductor device) connected to light a bulb within the brake lamp. The brake lamp is then lit by a power switching operation of the IPS device. In the switch direct driving method, turning on the brake lamp takes only about 5 ms from the moment the switch is turned on to the moment the bulb of the lamp is lit, therefore a following vehicle can quickly identify when the vehicle ahead of it is braking.

However, since the switch direct driving method directly lights the stop lamp without a Pulse Width Modulation (PWM) control (i.e., which is found in the MCU control method), diagnosing whether the bulb is operating appropriately through the system is impossible. In addition, the lifespan of the bulb may also be shortened.

In the MCU control method, a switch is turned on when a driver steps on a brake pedal. This inputs a switching-on signal from the switch into an MCU. The MCU then performs its own operation process and applies a current from the MCU to an IPS device. The bulb of a brake lamp it then lit by a power switching operation of the IPS device.

For example, Japanese Patent Application Publication No. 2004-355887 discloses a lamp control method in which a lamp is controlled with a low duty ratio when the lamp is initially lit and the duty ratio is gradually increased from there. Also, Japanese Patent Application Publication No. 2011-225055 discloses a control method in which judgment logic is executed to light the brake lamp when a driver steps on a brake pedal.

However, since the lamp lighting process by the MCU control takes substantially more time than the switching direct method to execute each lamps judgment logic, it takes about 40 ms to light the bulb in the brake light from the time the switch is turned on to the time the bulb is lit. The MCU control method is substantially slower.

Thus, in the switch direct driving method, since the turn-on time is only about 5 ms, following vehicles can quickly identify that the preceding vehicle is braking. However, in the MCU control method, since it takes about 40 ms to turn on the brake lamp, following vehicles may, in some instances, be notified two late that the preceding vehicle is braking, thus, causing an accident.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a combined control apparatus and method for a lamp of a vehicle, which can minimize the turn-one time of a lamp and extend the lifespan of the lamp, by providing a lamp lighting circuit using a switch direct driving method in combination with an MCU control method, lighting the lamp within a minimum turn-on time at the same time as when the switch is turned on due to the driver stepping on the brake pedal, and then allowing a lamp turn-on logic to progress by the MCU control method after a certain time elapses.

In one aspect, the present invention provides a combined control apparatus for a lamp of a vehicle, including: a switch configured to turn on and off a lamp; an Intelligent Power Switching (IPS) device associated with the lamp connected to an output of the switch; a switch monitoring line connected between the output of the switch and an input of a Micro Control Unit (MCU) to transmit a switch on/off state to the MCU; a lamp on/off monitoring line connected between the input of the MCU and the IPS device to transmit a power switching signal of IPS to the MCU; and a switching device mounted in a signal transmission line connected between the output of the MCU and the IPS device to be turned on by a control signal of the MCU at a certain time after turn-on of the lamp in response to the switch being turned on.

In another aspect, the present invention provides a combined control method for a lamp of a vehicle, including minimizing a turn-on time of the lamp by using: a switch direct driving method in which a switch is turned on when a driver steps on a brake pedal and thus the lamp is turned on; and a Micro Control Unit (MCU) control method in which after the lamp is turned on, the lamp remains turned on until the switch is turned off after a certain time.

In an exemplary embodiment, when the switch direct driving method is performed, a current signal according to the switch-on may be applied to an Intelligent Power Switching (IPS) device, and simultaneously may be inputted into the MCU as a switch monitoring signal.

In another exemplary embodiment, when the lamp is turned on by a power switching operation of an IPS due to the current signal applied to the IPS device, a power switching signal of the IPS device may input into the MCU as a lamp on/off monitoring signal.

In still another exemplary embodiment, in the MCU control method, the turn-on maintenance control of the lamp by the MCU may be performed by allowing a current control signal output from the MCU to turn on a switching device and applied to an IPS device at a certain time after the lamp is turned on according to the switch-on.

In yet another exemplary embodiment, the certain time may be determined as a time after an inrush section in which a current applied to a coil of a bulb instantaneously and rapidly increases when a bulb of the lamp is turned on by the switch direct driving method. The method may further include performing a diagnosis logic in which when an MCU transmits a control signal (on command) to an IPS device, the MCU receives a feedback of a current signal from the IPS device to determine whether a bulb state of the lamp is good or bad.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
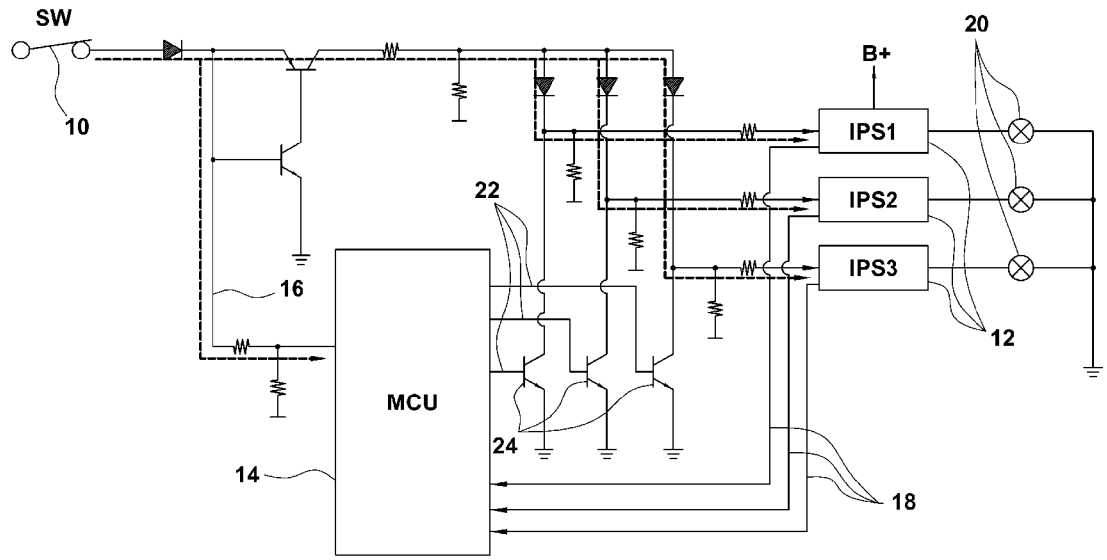
FIG. 1 is a circuit diagram illustrating a combined control apparatus for a lamp of a vehicle according to an exemplary embodiment of the present invention.
Figure 1:
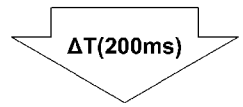
Figure 1:
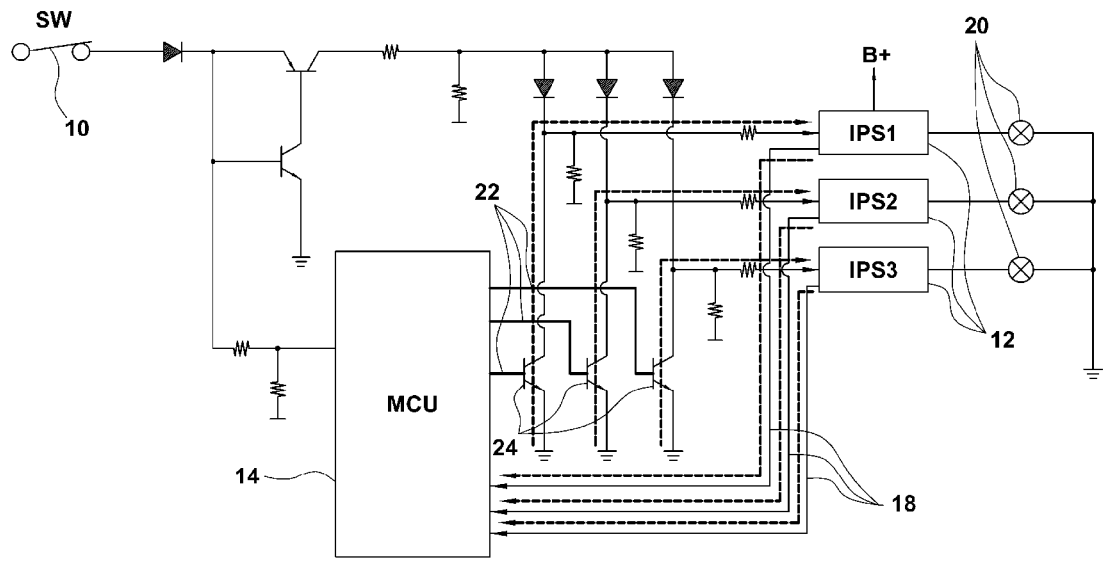

Reference numerals set forth in the Drawings includes reference to the following elements as further discussed below:

10: switch
12: IPS device
14: MCU
16: switch monitoring line
18: lamp on/off monitoring line
20: lamp
22: signal transmission line
24: switching device It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings.

In exemplary embodiment of the present invention, the turn-on time of a lamp can be minimized and the lifespan of the lamp can be extended by configuring a lamp lighting circuit in which the advantages of a switch direct driving method and an MCU control method for turning on lamps (particularly, brake lamp) are combined into a single circuit.

FIG. 1 is a circuit diagram illustrating a combined control apparatus for a lamp of a vehicle according to an embodiment of the present invention. As shown in FIG. 1, a switch 10 may be directly connected to one or more Intelligent Power Switching (IPS) devices 12 that are each acting as a power switching device of a lamp 20 (i.e., each lamp 20 has its own IPS device 12), and an MCU 14 may be connected between the switch 10 and the IPS device 12.

The switch 10 may be turned on when a driver steps on a brake pedal which in turn turns on the lamp 20, and may be turned off to turn off the lamp 20 when a driver takes his/her foot off the brake pedal. The switch 10 may be directly connected to the IPS device 12 so that power is applied to the lamp quickly.

The IPS device 12 may be configured to sense current in order to provide a diagnostic function. The IPS device 12 may also be configured to execute self-protective functions including switch and fuse functions, bulb control (Pulse Width Modulation (PWM) and Daytime Running Light (DRL) control), reduction of wire diameter, and extension of bulb lifespan.

More specifically, the IPS device 12 may have a reduced length and diameter of wires thereof due to its light weight and a smaller size and volume due to miniaturization of electronic parts thereof. Also, the IPS device 12 may include a low drive power source, and may have a load abnormality detection (bulb cut-off, motor stop) function and a circuit protection and failure diagnosis function against shorts to provide a certain degree of stability. Additionally, the IPS device may increase the durability of the switch, and improve power protection performance and voltage drop. Furthermore, the IPS device 12 does not require the replacement of a fuse and does not produce an operation noise. An IPS device can also respond to design changes very easily.

In the exemplary embodiment of the present invention, a switch monitoring line 16 may be connected between a current output line of the switch 10 and an input of the MCU 14 to transmit the switch on/off state to the MCU 14. Thus, when the switch 10 is turned on, a signal may be inputted into the MCU 14 through the switch monitoring signal 16 to inform the MCU 14 that the switch is currently turned on.

Also, a lamp on/off monitoring line 18 may be connected between the input of the MCU 14 and the IPS device 12 to transmit a power switching signal of IPS to the MCU 14. Thus, when the switch is turned on and the IPS device 12 is turned on by an applied current signal, a signal may be inputted into the MCU 14 through the lamp on/off monitoring line 18 to inform the MCU 14 that the IPS device 12 is turned on.

In addition, an output of the MCU 14 and the IPS device 12 of the lamp 20 may be connected to a signal transmission line 22 to transmit an MCU control signal, which is equipped with a switching device 24 such as a transistor turned on by the control signal of the MCU 14 after a certain amount of time has lapse (e.g., about 200 ms) after the lamp is turned on by turning-on of the switch 10.

Figure 2:
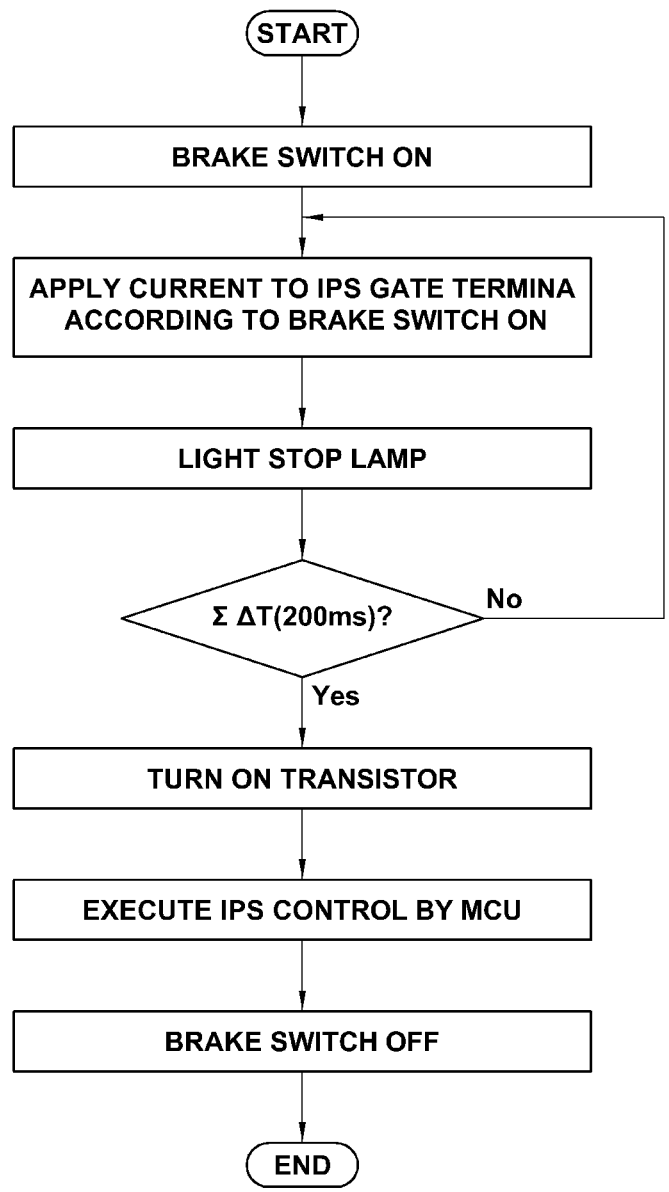
FIG. 2 is a flowchart illustrating a combined control method for a lamp of a vehicle according to an exemplary embodiment of the present invention.
Figure 3:
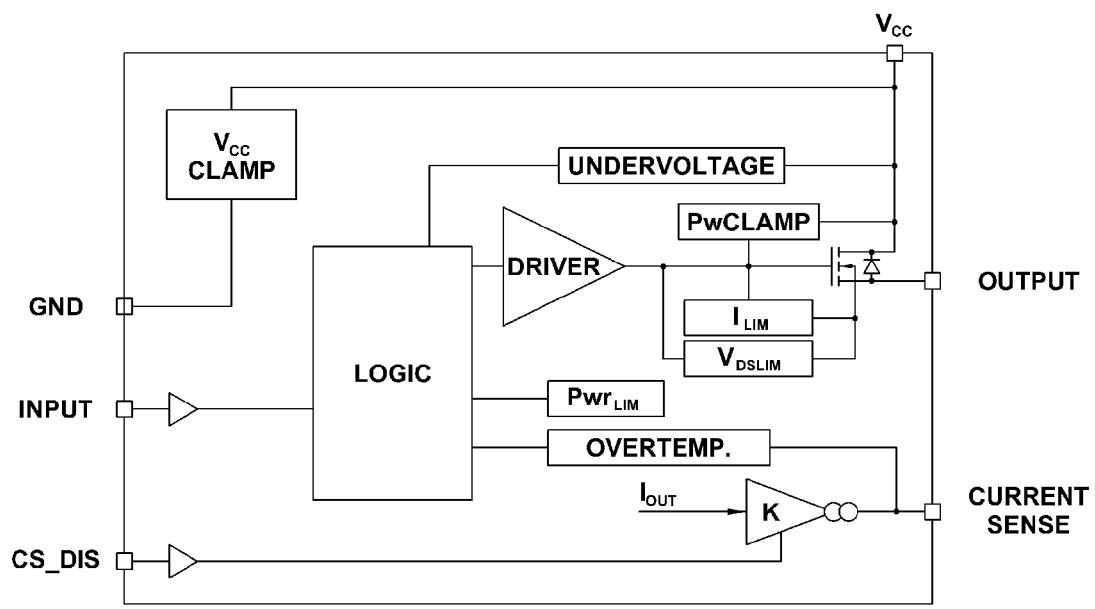
FIG. 3 is a circuit diagram illustrating an IPS device used in a combined control method for a lamp of a vehicle according to an exemplary embodiment of the present invention.

Hereinafter, a combined control method for a lamp of a vehicle configured based on the above constitution will be described in detain with reference to FIGS. 1 and 2.

First, when a driver steps on the brake pedal while driving the vehicle, the switch 10 is turned on and the lamp 20 is initially turned on by a switch direct driving method. Specifically, when the switch 10 is turned on by stepping on the brake pedal, a current signal according to the switch-on may be applied to the IPS device 12. Thus, the bulb of the lamp 20 may be turned on by the power switching operation of the IPS device 12. In this case, since turning on of the bulb, from the moment the switch 10 is turned on to the moment the bulb of the lamp 20 is lit, takes just about 5 ms, a following vehicle can quickly recognize the braking situation for safe driving.

As described above, since the switch direct driving method directly lights the brake lamp without a Pulse Width Modulation (PWM) control by the MCU control method, diagnosis of whether or not the bulb is operating appropriately would be impossible, and the lifespan of the bulb would shortened. However, in the Applicant's claimed invention, the system keeps the brake lamps turned on via the MCU control method after a certain time has elapsed from the time the lamp is turned on by the switch direct driving method.

This certain time refers a time (about 200 ms) after an inrush section in which a current applied to the coil of the bulb instantaneously and rapidly increases when the bulb of the lamp is turned on by the switch direct driving method.

Accordingly, when the current applied to the coil of the bulb rapidly increases, the MCU 14 may misinterpret the applied current as an overcurrent. Accordingly, the lamp may remain turned on by the MCU control method about 200 ms after inrush section elapses For this, when the power switch operation of the IPS device 12 to turn the lamp 20 on together with the turn-on of the switch 10 so that control logic is executed by the MCU control method, a power switching signal of the IPS device 12 may be inputted into the MCU 14 as a lamp on/off monitoring signal.

Furthermore, the control logic of the present invention may be embodied as non-transitory computer readable media on a computer readable medium containing executable program instructions executed by a processor, controller or the like e.g., within the MCU 14 and the IPS device 12. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Next, when the MCU 14 receiving the lamp on/off monitoring signal outputs a control signal to the signal transmission line 22, the switching device 24 equipped in the signal transmission line 22 may be switched on, and the control signal of the MCU 14 may be applied to the IPS device 12. Thus, the turn-on of the lamp may be maintained by the MCU 14.

Therefore, since the lamp turn-on logic executed the MCU control method is performed at a certain time after the turn-on of the lamp by the switch direct driving method, the MCU 14 can subsequently diagnosis the state of the lamp bulb, and can extend the lifespan of the lamp bulb through duty ratio control. For example, when the MCU 14 transmits a control signal (on command) to the IPS device 12, the MCU 14 can receive a feedback of a current signal from the IPS device 12 to determine whether the bulb state of the lamp is good or bad.

Advantageously, according to the exemplary embodiment of the present invention, since a lamp can be lit within a minimum amount of time due to the switch direct method while still providing an increased lifespan and diagnostic abilities, a responsive and efficient brake lamp control system may be implemented which provides the benefits of both the MCU and the switch direct methods.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A combined control apparatus for a lamp of a vehicle, comprising:
    a switch configured to turn on and off a lamp;
    an Intelligent Power Switching (IPS) device associated with the lamp connected to an output of the switch;
    a switch monitoring line connected between the output of the switch and an input of a Micro Control Unit (MCU) to transmit a switch on/off state to the MCU;
    a lamp on/off monitoring line connected between the input of the MCU and the IPS device to transmit a power switching signal of IPS to the MCU; and
    a switching device mounted in a signal transmission line connected between the output of the MCU and the IPS device to turn on by a control signal of the MCU at a certain time after on the lamp has initially been turned on by the switch.

2. A combined control method for a lamp of a vehicle, the method comprising:
    executing a switch direct driving method by turning on a switch when a brake pedal is pressed, the switching providing a signal to an Intelligent Power Switching (IPS) device which in turn powers a lamp; and
    in response to the lamp being on for a certain period of time, continuing to light the lamp via a Micro Control Unit (MCU) control method until the switch is turned off.

3. The combined control method of claim 2, wherein while the switch direct driving method is being performed, a current signal according to the switch-on is applied to an Intelligent Power Switching (IPS) device, and simultaneously is inputted into the MCU as a switch monitoring signal.

4. The combined control method of claim 3, wherein when the lamp is turned on by a power switching operation of an IPS due to the current signal applied to the IPS device, a power switching signal of the IPS device is inputted into the MCU as a lamp on/off monitoring signal.

5. The combined control method of claim 2, wherein in the MCU control method, the turn-on maintenance control of the lamp by the MCU is performed by allowing a current control signal outputted from the MCU to turn on a switching device and to be applied to an IPS device at a certain time after the lamp is turned on according to the switch-on.

6. The combined control method of claim 5, wherein the certain time is determined as a time after an inrush section in which a current applied to a coil of a bulb instantaneously and rapidly increases when a bulb of the lamp is turned on by the switch direct driving method.

7. The combined control method of claim 2, further comprising performing a diagnosis logic in which when an MCU transmits a control signal, on command, to an IPS device, the MCU receives a feedback of a current signal from the IPS device to determine whether a bulb state of the lamp is good or bad.

8. The combined control apparatus of claim 1, wherein the certain time is 200 ms.

9. The combined control method of claim 2, wherein the certain time is 200 ms.

* * * * *